United States Patent [19]
Zinn

[11] 4,110,003
[45] Aug. 29, 1978

[54] PORTABLE MOVIE SCREEN DEVICE

[75] Inventor: Robert W. Zinn, Addison, Ill.

[73] Assignee: Knox Manufacturing Company, Wood Dale, Ill.

[21] Appl. No.: 754,889

[22] Filed: Dec. 27, 1975

[51] Int. Cl.² ............................................. G03B 21/56
[52] U.S. Cl. ..................................... 350/117; 160/24; 248/160; 428/12
[58] Field of Search ................. 350/117; 160/24, 379; 248/158, 160; 161/3.5; 428/12

[56] References Cited

U.S. PATENT DOCUMENTS

| | | | |
|---|---|---|---|
| 3,255,988 | 6/1966 | Albee, Jr. | 350/117 X |
| 4,017,152 | 4/1977 | Allen | 350/117 |

FOREIGN PATENT DOCUMENTS

| | | | |
|---|---|---|---|
| 1,124,516 | 8/1968 | United Kingdom | 350/117 |

*Primary Examiner*—Richard A. Wintercorn
*Attorney, Agent, or Firm*—Wegner, Stellman, McCord, Wiles & Wood

[57] ABSTRACT

A portable movie screen device includes a flexible screen, a pair of stiffening members one secured at each of the opposite edges of the screen, a pair of tension elements secured together so as to be movable from collapsed relation to extended aligned relation, means for anchoring the extended tension elements to the stiffening members so as to place the screen in a taut viewing position, and means for supporting the screen in upright position. The support means may include a leg element secured to the tension elements. The stiffening members are hollow so that the collapsed elements may be stored therein. Various means are provided to connect the elements together and to fix them in operative position.

11 Claims, 11 Drawing Figures

U.S. Patent  Aug. 29, 1978  Sheet 1 of 2  4,110,003
FIG. 1
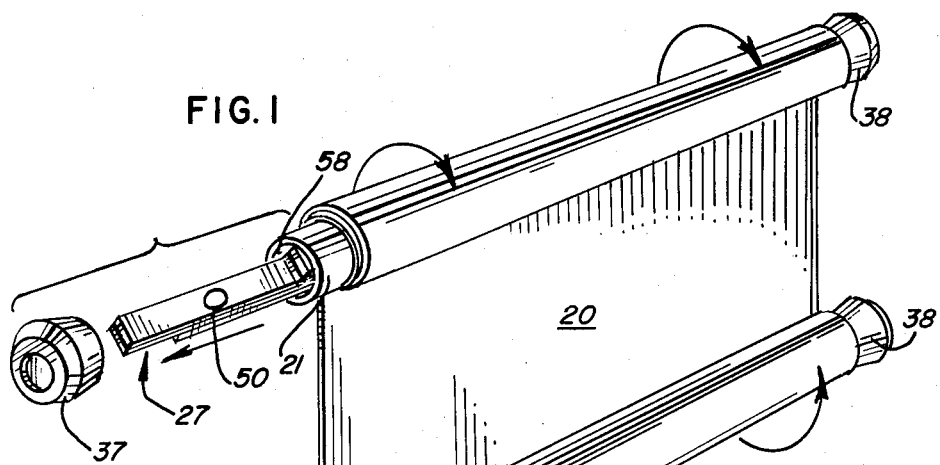
FIG. 3
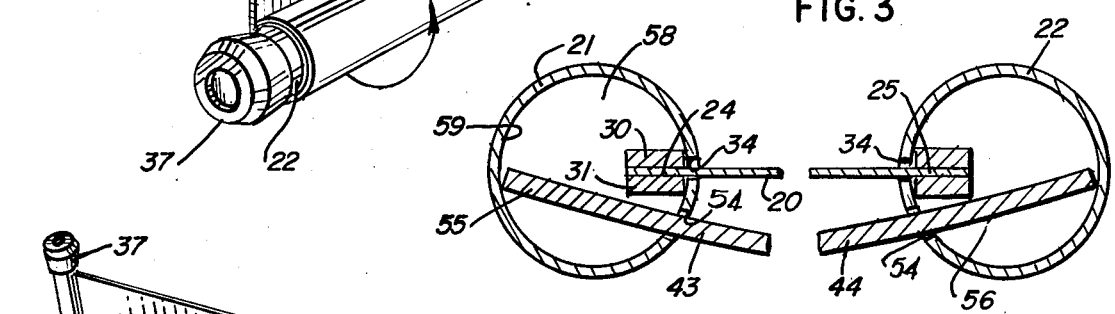
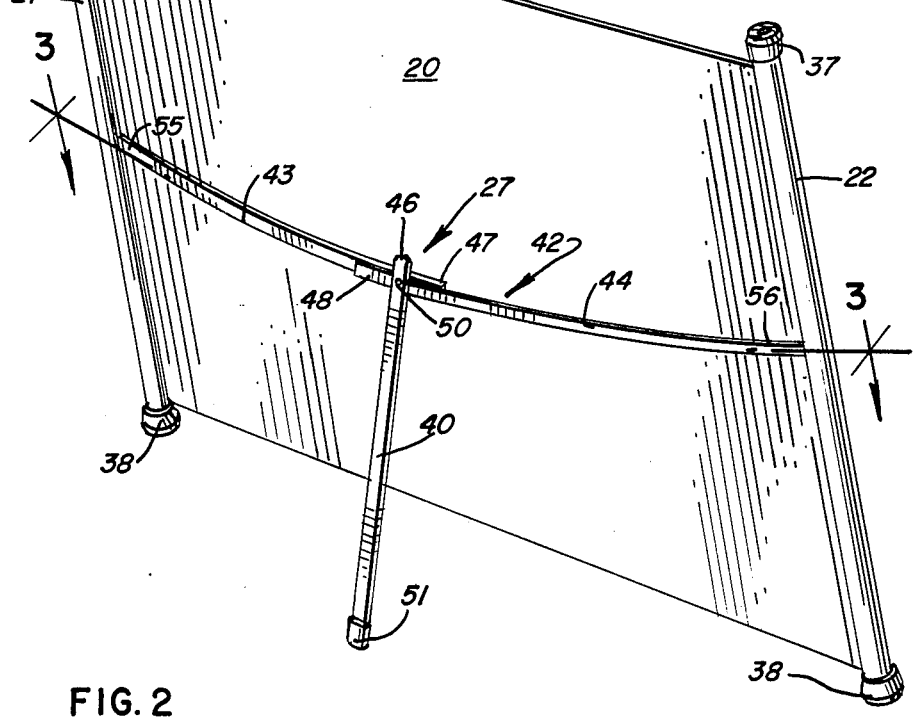
FIG. 2

PORTABLE MOVIE SCREEN DEVICE

BACKGROUND OF THE INVENTION

This invention relates generally to a movie projection screen device and, more particularly, to a portable screen which may be easily disassembled and stored in a relatively small space.

Du Mais U.S. Pat. No. 2,611,427 shows a rectangular projection screen of the general type to which the present invention is directed. Therein, a flexible screen was mounted between two rollers oppositely arranged along the long edges thereof. A single elongate rod held the rollers in spaced position to tension the screen. The lower roller provided a base for the screen while another rod acted as a support for the upper roller to hold the screen upright.

One major problem with the Du Mais structure was the size of the components. Even when the screen was disassembled and the flexible screen wound about one of the rollers, its size and the size of the packaging necessary to accommodate the screen for shipping was relatively large and cumbersome. Since the rollers which define the length of the final disassembled apparatus were long and narrow, significant shipping costs were encountered.

SUMMARY OF THE INVENTION

It is therefore a principal object of the invention to provide a portable screen which can be disassembled into a relatively compact package.

In accordance with the invention, a portable projection screen includes a flexible rectangular screen, a stiffening tube member along each of the short edges of the screen, a collapsible tensioning rod placed horizontally between the tube members to maintain them in spaced relationship and tension the flexible screen, and a leg element connected to the tensioning rod and extending downwardly so that it along with the tube members provides a support for the screen in an upright position.

Because of the rectangular shape of the screen, the tensioning rod has a length which is greater than that of the stiffening tube members utilized herein and is also greater than the length of the rollers utilized in a screen constructed in accordance with the teachings of Du Mais. Since the tube members in the present invention are utilized along the short edges of the screen rather than the long edges, the tensioning rod is the longest component. The length of the tensioning rod therefore would define the size of the package in which the portable screen could be wrapped. In order to reduce the length of the tensioning rod to a dimension not greater than the length of the tube members, the tensioning rod is constructed so that it is collapsible and may be folded to a reduced size. Hence, the shortened tube members actually define the largest dimension of the portable screen device when it is disassembled.

In one embodiment, the tensioning rod has two elements which, along with the leg element, are pivotally interconnected near their respective ends by a rivet extending through all of the parts. Cooperating detents and recesses on the tension elements hold the elements in aligned end-to-end relation when the tensioning rod is connected between the tube members.

In another embodiment in which the tension elements and the leg element are also interconnected by a rivet, a button releasably held in position by a leaf spring locks the elements in fixed relation whenever the button is suitably engaged. The button has a stub which can be inserted through an aligned aperture in each of the tension elements so that the tension elements can thereby be locked in either folded or unfolded positions.

In a third embodiment, one of the tension elements has a projection extending outwardly toward the other element in which a pair of cooperating slots are formed on opposite sides of the rivet. When the first tension element is rotated about the rivet relative to the second to a folded or unfolded position, the projection contacts the rear of one of the slots to prevent further rotation and provide proper alignment therebetween.

In another alternative embodiment, a knurled screw is substituted for the rivet and extends freely through an oversized aperture in two of the elements and is threaded into a threaded bore of the remaining element. When the knurled screw is tightened, the elements comprising the supporting structure are fixed securely together. When the knurled screw is loosened, the elements may be moved to a folded or unfolded position as desired.

When the supporting and tensioning structure which is comprised of the tension elements and the leg element is folded, it may be inserted into the interior of the tube members which are hollow. The folded supporting structure has a length which is less than the length of the tube members so that such insertion is permitted.

BRIEF DESCRIPTION OF THE DRAWINGS

FIG. 1 is a perspective view of a portable screen constructed according to the invention with the flexible screen partially unwound from the stiffening tubes and the folded supporting structure partially inserted into one of the stiffening tubes;

FIG. 2 is a rear perspective view with the screen fully extended to a viewing position and the supporting structure in an operative position;

FIG. 3 is an enlarged broken horizontal cross-sectional view illustrating the relationship between the flexible screen, the stiffening tubes and the tension elements;

DESCRIPTION OF THE PREFERRED EMBODIMENTS

Figure 4:
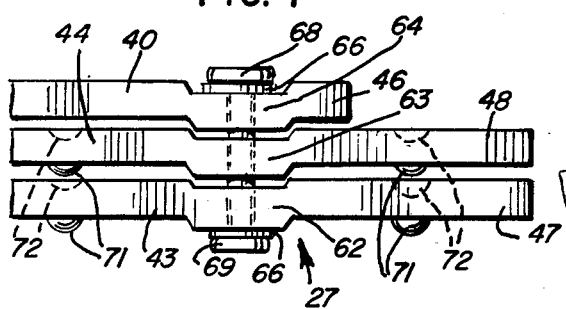
FIG. 4 is a fragmentary cross-sectional view of one embodiment of the supporting structure shown in a folded position.

Referring to FIGS. 1-3, a portable screen device constructed according to the invention is seen to include a rectangular flexible screen 20 onto which an image may be projected for viewing, a pair of hollow elongate tubes 21 and 22 secured on respective short lateral edge margins 24 and 25 of the screen 20, and a supporting structure, generally designated 27.

As best seen in FIG. 3, each of the lateral edge margins 24 and 25 of the screen 20 are secured between a pair of slats 30 and 31 by staples (not shown) or the like to provide an enlarged end. The slats 30 and 31, which preferably have a length equal to the height of the lateral edge margins 24 and 25, may be inexpensively constructed from cardboard or wood.

Each of the tubes 21 and 22 has a longitudinal slit 34 extending between the opposite ends thereof. The tubes 21 and 22 are secured to the screen 20 by sliding the enlarged edge margins 24 and 25 into the open ends of the tubes 21 and 22 and the screen 20 into the respective slits 34. The width of the slit 34 is slightly greater than the thickness of the screen 20, but is substantially less than the combined thickness of the screen 20 and the slats 30 and 31 to prevent the screen 20 from being pulled out of the tubes 21 and 22. The tubes 21 and 22 and the slats 30 and 31 provide a means for rendering the lateral edges of the screen relatively stiff.

End caps 37 and 38 are friction fit over the tubes 21 and 22 at each end to close the ends of the slits 34 and to close off the interior of the tubes 21 and 22 and maintain the enlarged edge margins 24 and 25 properly aligned therein. The flexible screen 20 may be wound about the tube 21 or 22 as partially shown in FIG. 1 so that the flexible screen is in a rolled closed storage position. When the screen 20 is unrolled and the tubes 21 and 22 are moved apart, the screen 20 is placed in an open viewing position and extends in a planar fashion between the tubes 21 and 22 as seen in FIG. 2.

The supporting structure 27 includes an elongate rod element 40 and a folding or collapsible tensioning portion, generally designated 42, which is comprised of elongate tension elements 43 and 44. The upper end portion 46 of the rod element 40 and the inner end portions 47 and 48 of the respective tension elements 43 and 44 are pivotally joined at 50. The rod element 40 and the tension elements 43 and 44 are formed from flat rolled wire and have a thickness of approximately 1/16-3/32 inch and a width of ⅜-½ inch. The rod element 40 and the tension elements 43 and 44 are relatively rigid, but may be flexed. All are inherently resilient so that they will tend to return to their original shape when flexed.

When the screen 20 is completely unwound and the tubes 21 and 22 are moved completely apart to fully extend the screen material, the tensioning portion 42 is positioned horizontally across the rear of the screen 20 to provide structural rigidity and the rod element 40 is positioned perpendicular to the tensioning portion 42 to extend vertically downwardly therefrom. The rod element 40, together with the lower ends 38 of the tubes 21 and 22, provide support to hold the portable screen in upright position when placed on a horizontal supporting surface (not shown).

Each of the tubes 21 and 22 has a centrally disposed aperture 54 configured to receive and anchor the outer ends 55 and 56 of the tension elements 43 and 44. To provide a relatively rigid structure, the extended tensioning portion 42 is slightly longer than the lateral width of the screen. As seen in FIG. 3, the outer ends 55 and 56 of the tensioning portion 42 extend through the respective apertures 54 into the interior chamber 58 of the tubes 21 and 22 and bear against the inner surface 59 thereof. During assembly of the portable screen, after one outer end of the tensioning portion 42 is inserted into its respective aperture 54, the tensioning portion 42 must be flexed to bow outwardly from the screen 20 in order that the other end can be inserted into the other aperture 54. The resiliency of the tensioning portion 42 forcefully maintains the tubes 21 and 22 and, therefore, the screen edge margins 24 and 25 in spaced relation. The resiliency of the tensioning portion 42 thus stretches the screen 20 tautly between the tubes 21 and 22.

FIGS. 4-11 illustrate alternative embodiments of the supporting structure 27. Because parts of the supporting structure 27 are similar in the various drawings, for purposes of brevity and clarity, similar parts in the various figures will retain the same identifying numerals.

Figure 5:
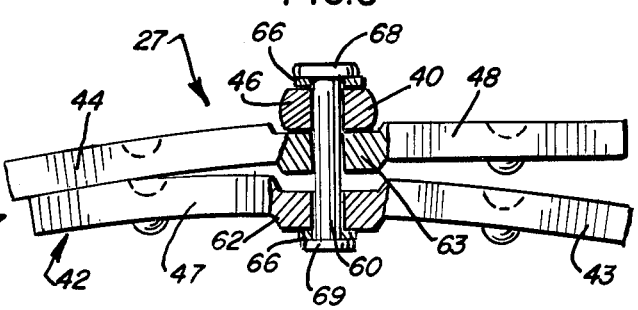
FIG. 5 is a fragmentary cross-sectional view of the embodiment shown in FIG. 4 with the supporting structure in an unfolded flexed position.

In FIGS. 4 and 5, the respective inner ends 47 and 48 of the tension elements 43 and 44 and the upper end 46 of the rod element 40 are loosely pivotally interconnected by a rivet 60 extending through offset portions 62, 63 and 64, respectively. Washers 66 may be disposed between the head 68 of the rivet 60 and the rod element 40 and between the upset end 69 of the rivet 60 and the tension element 43, if desired. The tension elements 43 and 44 have cooperating detents 71 and recesses 72.

When the supporting structure 27 is in an inoperative folded position (FIG. 4) with the elements in overlapping relation, it may be stored within one of the tubes 21 or 22 by removing one of the end caps 37 or 38 and inserting it into the interior chamber 58 as illustrated in FIG. 1.

When the tension element 43 is rotated 180° relative to the other tension element 44 to an operative position (FIG. 5), the tensioning portion 42 is extended to its full length. Similarly, the rod element 40 is rotated to an operative position perpendicular to the tensioning portion 42. When the tensioning portion 40 is flexed to insert the outer ends thereof into the tubes 21 and 22, the tensioning portion 42 will be bowed as seen in FIG. 5 in exaggerated fashion thereby tightening the rivet connection and effecting cooperative engagement between the respective detents 71 and recesses 72 to lock the respective elements together in aligned relation.

Figure 6:
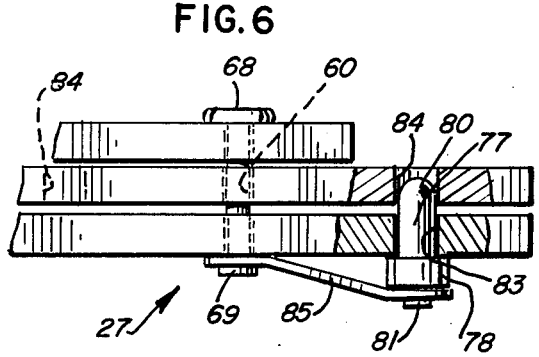
FIG. 6 is a fragmentary cross-sectional view of the second embodiment of the supporting structure shown in a folded position.
Figure 7:
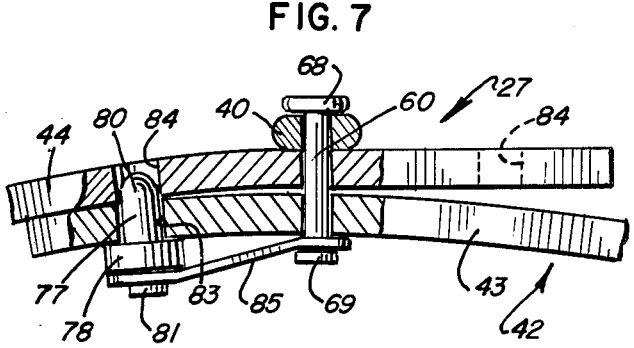
FIG. 7 is a fragmentary cross-sectional view of the embodiment shown in FIG. 6 in an unfolded flexed position.

In FIGS. 6 and 7, an alternative embodiment of the supporting structure 27 is shown. Herein, a button 77 is utilized to latch the elements together. The button 77 has an enlarged head portion 78 with oppositely projecting stubs 80 and 81 extending therefrom. The tension elements 43 and 44 have apertures 83 and 84, respectively, which are adapted to receive the stub 80. A leaf spring 85 fixed to the structure 27 by the rivet 60 resiliently retains the button 77 in position within the apertures 83 and 84. The stub 81 extends through an aperture (not numbered) in the leaf spring 85 so that it is securely held.

In FIG. 6, the supporting structure 27 is secured in an inoperative position with the button 77 retained by the leaf spring 85 so that the stub 80 extends through the apertures 83 and 84 to lock the tension elements 43 and 44 against relative rotation. When the button 77 is pulled from the aperture 84 against the action of the spring 85, the tension element 43 may be rotated about the rivet 60 180° relative to the tension element 44 to the operative position shown in FIG. 7. Thereafter, the button 77 can be reinserted to secure the tension elements 43 and 44 together in aligned relation.

Figure 8:
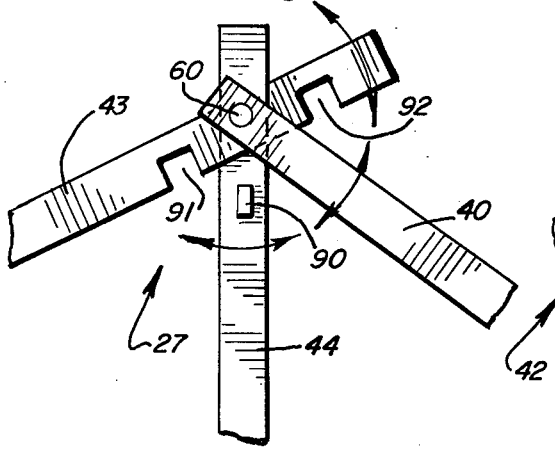
FIG. 8 is a fragmentary plan view of a third embodiment of the supporting structure shown in a partially unfolded position.
Figure 9:
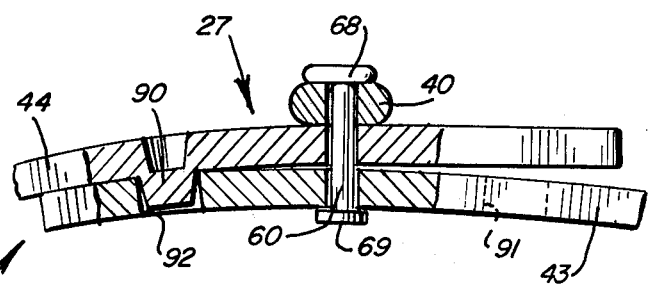
FIG. 9 is a fragmentary cross-sectional view of the embodiment shown in FIG. 8 in an unfolded flexed position.

A third embodiment of the supporting structure 27, illustrated in FIGS. 8 and 9, also has the respective ends of the tension elements 43 and 44 and the rod element 40 riveted together. Herein, the tension element 44 has a stamped projection 90 which may cooperate with either of the cut-out slots 91 or 92 formed in the tension element 43. When the tension element 44 is folded to an inoperative position, the projection 90 will abut the rear of the slot 91 to prevent further rotation. When the tension element 43 is unfolded to an extended operative position (FIG. 9), the projection 90 will abut the rear of slot 92.

Figure 10:
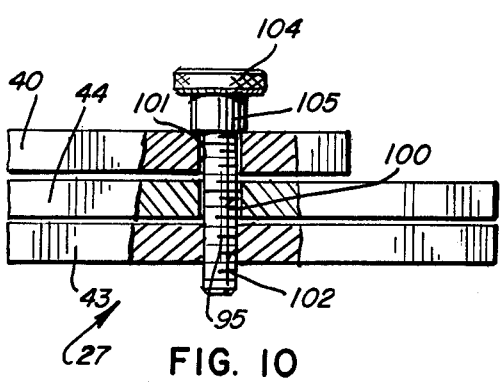
FIG. 10 is a fragmentary cross-sectional view of a fourth embodiment of the supporting structure shown in a folded position.
Figure 11:
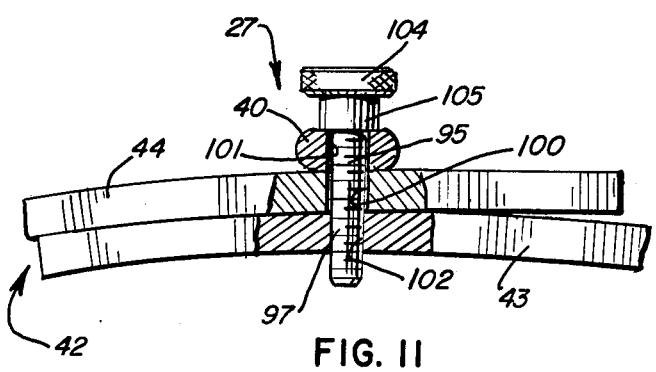
FIG. 11 is a fragmentary cross-sectional view of the embodiment shown in FIG. 10 in an unfolded flexed position.

In FIGS. 10 and 11, the supporting structure 27 is held together by a knurled thumb screw 95. The shank 97 of the thumb screw 95 extends through oversized apertures 100 and 101 in the tension element 44 and the rod element 40, respectively, and is screwed into a threaded bore 102 formed in the tension element 43. The thumb screw 95 has an enlarged knurled head portion 104 which may be easily grasped by the operator. The thumb screw 95 is tightened onto the rod element 40 until the internal shoulder 105 bears against the rod element 40 to fix the supporting structure 27 together and need only be unscrewed slightly to permit the parts thereof to be folded or unfolded. FIG. 10 illustrates the supporting structure 27 in a folded position, while FIG. 11 illustrates it in an unfolded position.

I claim:

1. A portable movie screen device, comprising: a flexible screen for viewing a projected image; a first elongate stiffening member and a second elongate stiffening member each secured to an opposite marginal edge portion of said screen, the screen being rolled upon one of the stiffening members in closed storage position and extending in planar fashion between the members in open viewing position; a pair of elongate resilient tension elements having interengaging means on adjacent inner end portions for releasably holding said tension elements in aligned extended position, disengagement of the interengaging means permitting said tension elements to be placed in juxtaposed collapsed position; anchoring means in the midportion of each stiffening member spaced to receive the opposite outer end portions of each resilient tension element when the tension elements are flexed and bowed to tensioning position, the resiliency of said tension elements urging the stiffening members in opposite directions to stretch the screen tautly therebetween; and support means for holding the screen upright on a surface when stretched between the stiffening members.

2. A device as specified in claim 1 in which one of the stiffening members has an inner chamber of a size and length to accommodate the support means and the tension elements in collapsed position when the screen is in closed storage position.

3. A device as specified in claim 1, in which the inner end portions of the tension elements are pivotally secured together.

4. A device as specified in claim 3, in which the support means is an elongate rod pivotally secured to the inner end portions of the tension elements.

5. A device as specified in claim 1 in which the screen in viewing position rests upon corresponding ends of each of the stiffening members.

6. A device as specified in claim 1 in which the interengaging means is a pair of latching portions, one on each inner end portion of each tension element, the latching portions being engageable when the tension elements are in extended position.

7. A device as specified in claim 1 in which the inner end portions of the tension elements are pivotally secured together and latch means is provided to secure the tension elements in collapsed position.

8. A device as specified in claim 1 in which the interengaging means is a detent and recessed portion positioned for engagement when the tension elements are in extended position, the detent being on one inner end portion of one tension element and the recessed portion being on the other inner end portion of the other tension element.

9. A device as specified in claim 1 in which the interengaging means is a thumb screw threadably received in the inner end portion of one tension element and extending through the inner end portion of the other tension element.

10. A device as specified in claim 1 in which the support means includes an elongate rod pivotally secured to the inner end portions of the tension elements so that the screen in viewing position is supported upon corresponding ends of the stiffening members and the free end of the rod extending generally perpendicular of the tension elements.

11. A portable movie screen device, comprising: a flexible rectangular screen for viewing a projected image having a width greater than its heighth; a first elongate hollow stiffening member and a second elongate hollow stiffening member each secured to one of the short marginal edge portions of said screen, the screen being rolled upon one of the stiffening members in closed storage position and extending in planar fashion between the members in open viewing position; a pair of elongate resilient tension elements having interengaging means on adjacent inner end portions for releasably holding said adjacent inner end portions in fixed relation when the tension elements are in a tensioning position, said tension elements having a combined length greater than either said screen heighth or the length of the stiffening members when the tension elements are moved to their aligned tensioning position and having a length less than said screen width when the interengaging means is disengaged and the tension elements moved to a collapsed position adjacent each other; anchoring means in the midportion of each stiffening member for receiving the opposite outer end portions of each tension element when the aligned tension elements are flexed and bowed to tension the screen, the resiliency of said tension elements urging the stiffening members in opposite directions to stretch the screen tautly therebetween; and support means for holding the screen upright on a surface when stretched between the stiffening members, whereby said tension elements may be moved to a collapsed position and inserted into one of said hollow stiffening members for storage.

* * * * *